US011764551B2

(12) United States Patent
Rival et al.

(10) Patent No.: US 11,764,551 B2
(45) Date of Patent: Sep. 19, 2023

(54) MULTIPOLAR ELECTRICAL PROTECTION SYSTEM AND ELECTRICAL INSTALLATION COMPRISING SUCH A SYSTEM

(71) Applicant: Schneider Electric Industries SAS, Rueil Malmaison (FR)

(72) Inventors: Marc Rival, Bernin (FR); Cyril Domenech, Proveysieux (FR); Stéphane Dye, Vatilieu (FR); Daniel Rota, Vif (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 169 days.

(21) Appl. No.: 17/121,892

(22) Filed: Dec. 15, 2020

(65) Prior Publication Data

US 2021/0194222 A1 Jun. 24, 2021

(30) Foreign Application Priority Data

Dec. 18, 2019 (FR) ...................................... 1914942

(51) Int. Cl.
*H01H 71/08* (2006.01)
*H02B 1/20* (2006.01)
(Continued)

(52) U.S. Cl.
CPC ........... *H02B 1/20* (2013.01); *H01H 71/0271* (2013.01); *H01H 71/08* (2013.01); *H01R 25/006* (2013.01); *H02B 5/00* (2013.01); *H02B 1/012* (2013.01)

(58) Field of Classification Search
None
See application file for complete search history.

(56) References Cited

U.S. PATENT DOCUMENTS 3,999,103 A * 12/1976 Misencik ................ H02H 3/33
361/45
5,773,778 A * 6/1998 Arnold ................... H01H 71/50
335/185
(Continued)

FOREIGN PATENT DOCUMENTS

EP 0957500 A1 11/1999
EP 1453073 A1 9/2004
(Continued)

OTHER PUBLICATIONS

Republique Francaise Institut National De La Propriete Industrielle, French Search Report and Opinion for French Patent Application No. FR1914942 dated Sep. 1, 2020, 9 pages.

*Primary Examiner* — Courtney L Smith
(74) *Attorney, Agent, or Firm* — Locke Lord LLP (57) ABSTRACT

A multipolar electrical protection system including a plurality of devices for switching an electric current. Each switching device has a plurality of compartments each comprising an extinguishing chamber and a pair of separable electrical contacts that are connected to upstream and downstream connection terminals, the separable electrical contacts being movable between open and closed positions under the action of a tripping device. The switching devices are separate from one another, while the upstream terminals of each device are connected by a first connector in order to keep them at one and the same electrical potential and the downstream terminals of each device are connected by a second connector in order to keep them at one and the same electrical potential. The switching devices are controlled by one and the same common tripping device.

13 Claims, 5 Drawing Sheets

(51) Int. Cl.
    *H01H 71/02*     (2006.01)
    *H01R 25/00*     (2006.01)
    *H02B 5/00*     (2006.01)
    *H02B 1/01*     (2006.01)

(56) References Cited

U.S. PATENT DOCUMENTS

| | | | | |
|---|---|---|---|---|
| 6,177,641 | B1* | 1/2001 | Morel | H01H 3/3021 |
| | | | | 200/50.26 |
| 6,218,636 | B1* | 4/2001 | Blancfene | H01H 9/34 |
| | | | | 218/150 |
| 6,248,971 | B1* | 6/2001 | Morel | H01H 71/1045 |
| | | | | 218/152 |
| 10,020,144 | B2* | 7/2018 | Rival | H01H 73/18 |
| 11,398,363 | B2* | 7/2022 | Courson | H01H 71/0207 |
| 2007/0252599 | A1* | 11/2007 | Zhou | H01H 9/563 |
| | | | | 324/424 |
| 2015/0155113 | A1* | 6/2015 | Newase | H01H 71/125 |
| | | | | 200/293 |
| 2016/0111230 | A1* | 4/2016 | Fonseca | H01H 71/08 |
| | | | | 361/93.6 |
| 2019/0131100 | A1* | 5/2019 | Fleitmann | H01H 71/123 |
| 2022/0076911 | A1* | 3/2022 | Gonalves | H01H 71/02 |

FOREIGN PATENT DOCUMENTS

| | | | |
|---|---|---|---|
| EP | 2284851 | A2 | 2/2011 |
| EP | 3125266 | A1 | 2/2017 |
| EP | 3499659 | A1 | 6/2019 |

\* cited by examiner

MULTIPOLAR ELECTRICAL PROTECTION SYSTEM AND ELECTRICAL INSTALLATION COMPRISING SUCH A SYSTEM

TECHNICAL FIELD

The present invention relates to a multipolar electrical protection system and to an electrical installation comprising such a system.

BACKGROUND

Electrical protection systems such as circuit breakers are switching devices which allow the electric arc that may form when an electrical circuit is opened to be channelled and dissipated. When a circuit breaker is able to open a plurality of electrical circuits, corresponding to a plurality of electrical phases, also called poles, together, it is referred to as a multipolar circuit breaker.

Circuit breakers are generally designed for a given rating, i.e. for a given current and/or power range.

However, the changing requirements for circuit breakers, in particular in conjunction with wind energy production and the increase in the size of wind turbines, nowadays necessitates circuit breakers that are capable of handling currents of very high amperage, ranging up to 10 kA or even 12 kA, and in what is called the "low-voltage" domain, for example between voltages that may reach between 690 V and 1200 V.

Conventional approaches for manufacturing modular circuit breakers no longer allow circuit breakers of acceptable performance to be obtained, the increase in the number of elementary switching devices aligned with one another causing problems in terms of bulk and in terms of removing the heat fluxes generated by such very-high-amperage electric currents.

SUMMARY

It is these problems which the invention more particularly aims to address, by providing a multipolar electrical protection system with a compact and modular structure, which has a high rating per pole and the tripping of which is synchronized regardless of the number of poles.

To this end, the invention relates to a multipolar electrical protection system including a plurality of switching devices for switching an electric current. Each switching device has a plurality of compartments, each compartment comprising an extinguishing chamber and a pair of separable electrical contacts that are connected to upstream and downstream connection terminals, the separable electrical contacts being movable between open and closed positions under the action of a tripping device. According to the invention, the switching devices are separate from one another, while the upstream terminals of each device are connected by a first connector in order to keep them at one and the same electrical potential, the downstream terminals of each device are connected by a second connector in order to keep them at one and the same electrical potential and the switching devices are controlled by one and the same common tripping device.

By virtue of the invention, the switching devices, the tripping of which is synchronized, may be arranged so as to remove the heat fluxes associated with the high-amperage currents. Each switching device is rated according to the power and current associated with each pole. The common tripping device makes it possible to synchronize the tripping of each switching device with the others.

According to some advantageous but non-mandatory aspects of the invention, such an electrical protection system may incorporate one or more of the following features, in any technically permissible combination:

- the first and second connectors of a switching device are located on a rear face of the device, are arranged transversely one above the other and each comprise connection pads, each associated/connected with one of the upstream or downstream terminals, each bar comprising as many connection pads as the switching device comprises extinguishing chambers;
- the first and second connectors of a switching device have the same structure and are oriented in two opposite transverse directions, the connection pads of the two connectors of one and the same device each being located in vertical planes that are distinct from one another;
- the switching devices include one and the same number of extinguishing chambers;
- each switching device comprises two, three or four extinguishing chambers;
- each extinguishing chamber of a switching device opens onto an upper face of the switching device via a respective degassing opening, while the devices are spaced apart from one another in a direction orthogonal to the upper face so as to leave the degassing openings free of the other devices;
- each switching device includes a switchover mechanism for moving the separable contacts of said device, said switchover mechanisms being coupled to the tripping device;
- the tripping device forms part of an electronic control device distinct from the switching devices;
- the protection system includes accommodating bases, intended for attachment to an electrical installation, each base comprising electrical connections that are positioned so as to reversibly cooperate together with the connectors of a switching device;
- a first switching device includes an actuator and a switchover mechanism, the other switching devices being coupled to the first switching device by a mechanical unit that is arranged on the outside of the devices and connects these devices to one another;
- the switching device that includes the actuator also includes the tripping device which drives the actuator;
- each switching device includes a common control shaft to which the separable contacts are coupled, the shafts of each device being coupled to the mechanical unit;
- the protection system comprises a frame for the attachment of the switching devices, while the frame and the mechanical unit are made of a non-ferromagnetic, preferably metal material.

BRIEF DESCRIPTION OF THE DRAWINGS

The invention will be better understood and other advantages thereof will become more clearly apparent in the light of the following description of two embodiments of a multipolar electrical protection system and of an electrical installation that are in accordance with its principle, given solely by way of example and with reference to the appended drawings, in which.

DETAILED DESCRIPTION

Figure 1:
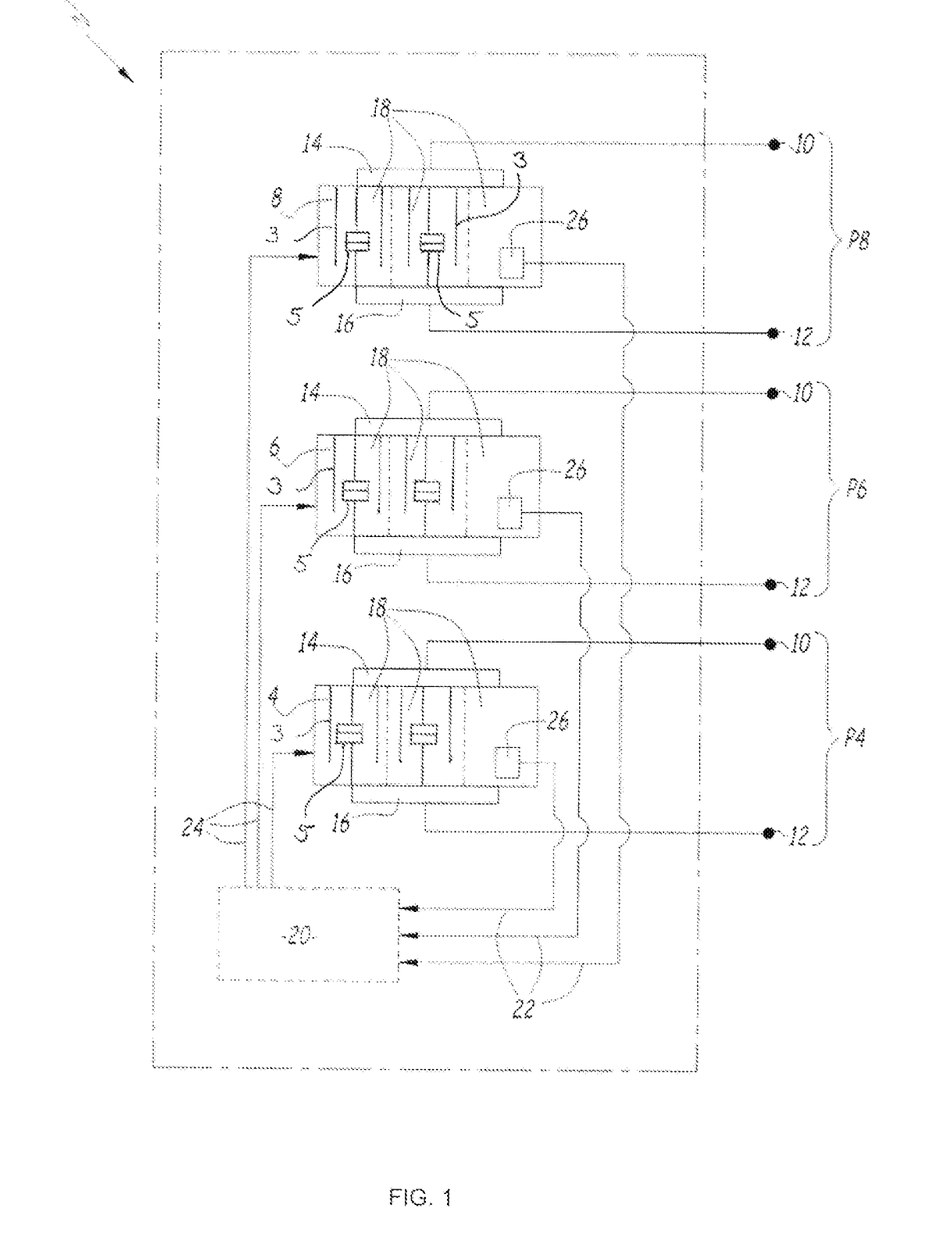
FIG. 1 is a schematic view of a multipolar electrical protection system according to some embodiments and in particular according to a first embodiment of the invention.

A multipolar electrical protection system 2 according to a number of embodiments is shown in FIG. 1.

The protection system 2 comprises a plurality of switching devices, for example three, here referenced 4, 6 and 8.

Each of the switching devices 4 to 8 is an electrical switchover device which is able to interrupt an electric current flowing across separable contacts and which can be switched over between an open state and a closed state.

Advantageously, the switching devices 4 to 8 are for example existing circuit breaker sub-assemblies, and/or comprise existing low-voltage circuit breaker components.

For example, the protection system 2 is intended for use in an electrical installation, such as an electricity distribution or production installation. According to some examples, an electrical installation includes an electric generator, at least one electrical load, and a switching device 2 connected between the generator and said electrical load. For example, the generator may be an aerogenerator, in particular a wind turbine.

The switching devices 4 to 8 are separated from one another.

Preferably, the switching devices of the system 2 are substantially identical to one another and perform a similar function such that, for simplicity, only one of these switching devices is described in detail in what follows.

Each of the devices 4 to 8 is associated with an electrical pole or electrical phase, referenced P4, P6 and P8, respectively.

In alternative embodiments, the system 2 may include a different number of switching devices. According to some examples, the system 2 comprises two switching devices. According to other examples, the system 2 comprises four switching devices. In this sense, the protection system 2 is referred to as multipolar.

Each of the poles P4 to P8 is associated with an upstream terminal 10 and with a downstream terminal 12. In the present description, the concepts of "upstream" and "downstream" are used to distinguish between the various elements of the protection system 2, and do not presuppose any particular direction of connection of the various elements of the protection system 2.

For each of the devices 4 to 8, the upstream terminal 10 is connected to an upstream connector 14, which is mounted on the corresponding device 4 to 8. Analogously, each downstream terminal 12 is connected to a respective downstream connector 16.

Each of the devices 4 to 8 comprises a plurality of compartments 18. Advantageously, the devices 4 to 8 have the same number of compartments 18. In the example illustrated, each of the devices 4 to 8 comprises three compartments 18.

Each of the compartments 18 comprises an extinguishing chamber 3 and a pair of separable electrical contacts 5 (shown in FIG. 1 in only two of the three compartments 18 of each of the devices 4 to 8 for conciseness), these adjoining the extinguishing chamber. By extension, the reference 18 relating to each of the compartments also includes the extinguishing chamber housed in said compartment.

The separable contacts of each of the pairs are connected, respectively, to an upstream terminal or to a downstream terminal, which are not shown. The separable contacts are reversibly moveable between open and closed positions.

For example, the separable contacts of each switching device 4 to 8 are coupled to a control shaft common to the whole device. This shaft may be set in motion by a switchover mechanism, such as an energy accumulation mechanism. This mechanism may be activated by means of an actuator, such as an electromechanical actuator, in particular an electromagnetic actuator. In practice, this actuator may be driven by a tripping device 20.

When all of the separable contacts of one of the switching devices 4 to 8 are in the open/closed state, it is said by extension that the corresponding device 4 to 8 is also in the open/closed state.

For each device 4, 6 and 8, the upstream terminals are connected to the same upstream connector 14 and are thus brought to one and the same electrical potential.

Analogously, for each device 4 to 8, the downstream terminals are connected to the same downstream connector 16 and are thus brought to one and the same electrical potential.

The switching devices 4 to 8 are connected to one and the same tripping device 20. The tripping device 20 is configured to receive and process the information from each of the devices 4 to 8.

According to some examples, the tripping device 20 may be an electronic tripping device including an electronic circuit and/or a processor, in particular programmed to detect potential electrical faults on the basis of information from each switching device 4 to 8, such as electric current and/or voltage measurements.

For example, the tripping device 20 is connected by data links 22 to measurement devices 26 associated with the switching devices 4 to 8. The tripping device 20 is further connected by data links 24 to one or more actuators associated with the switching devices 4 to 8 in order to switch over their separable electrical contacts between their open and closed states.

For example, the measurement devices 26 may comprise one or more current sensors and/or voltage sensors and/or sensors configured to measure any relevant electrical quantity.

According to some examples, the tripping device 20 forms part of an electronic control unit, which is also configured to transmit switchover orders, for example open, close and reset orders, to each of the devices 4 to 8.

In particular, the trip orders sent by the tripping device 20 are sent together to all of the switching devices 4, 6 and 8 of the protection system 2. In other words, the switching devices 4 to 8 are controlled by the same tripping device 20.

According to some examples, a single tripping device 20 is associated with the various devices 4, 6 and 8.

In a first embodiment, and as illustrated in FIG. 1, the tripping device 20 is distinct from the devices 4 to 8. The tripping device 20 forms for example part of an electronic control unit that is distinct from the devices 4 to 8.

In other words, the slaving of the switching devices 4 to 8 to the common tripping device 20 is achieved electronically.

According to other examples, the tripping device 20 may be integrated into one of the switching devices 4 to 8, the one of the switching devices 4 to 8 which includes the tripping device 20 then being called the "master" switching device, while the other switching devices which do not include the tripping device 20 are called "slave" switching devices.

Optionally, but nevertheless advantageously, the switching devices 4 to 8 are detachable, i.e. each of the switching devices 4 to 8 cooperates reversibly with a respective accommodating base. More precisely, each accommodating base comprises electrical connections which are reversibly electrically connected together with the upstream and downstream connectors 14 and 16 of the corresponding device 4 to 8 via a simple translational movement of the devices 4 to 8 with respect to the respective accommodating base in a direction of mounting.

The devices 4 to 8 are thus easily removable and replaceable, for example when performing maintenance.

In such a case, the data links 22 and 24 are themselves also detachable, i.e. the connecting and/or disconnecting of the links 22 et 24 take place together with the connecting and/or disconnecting of the connectors 14 and 16 when mounting/dismounting the switching device 4 to 8 on/from a respective accommodating base.

FIGS. 2 to 5 illustrate a second embodiment of the protection system 2.

In the second embodiment, those elements which are analogous to those of the first embodiment bear the same references plus 100, and work in the same way. For example, in FIGS. 2 to 5, the protection system is referenced 102. The system 102 includes three switching devices, referenced 104, 106 and 108, which correspond to the switching devices 4, 6 and 8 of the first embodiment shown in FIG. 1. However, here again, the number of switching devices is not limiting and could differ.

In what follows, mainly the differences between the first and second embodiments are described.

The protection system 102 differs in particular from the protection system 2 in that the switching devices 104 to 108 are mechanically coupled to one another so as to be controlled by one and the same tripping device 120, this latter performing a similar or identical role to that of the tripping device 20 described above.

In other words, the slaving of the switching devices 104 to 108 to the common tripping device 120 is achieved mechanically, for example by virtue of a mechanical connecting unit 124, which is described in greater detail below.

The three switching devices 104 to 108 are mounted on an attachment frame 128. In the example illustrated, the frame 128 is formed of metal profiles joined to one another, for example by welding. Other embodiments of the frame 128 are however possible. In the views of FIGS. 2 to 5, the frame 128 is shown placed on a horizontal surface.

In the rest of the description, the terms "up", "down", "in front of", "behind", "lateral", "right", "left", etc., are given with reference to the orientation of the elements of the protection system 2 in the drawings but do not presuppose, unless specifically stated, a particular working of the system 2.

Figure 3:
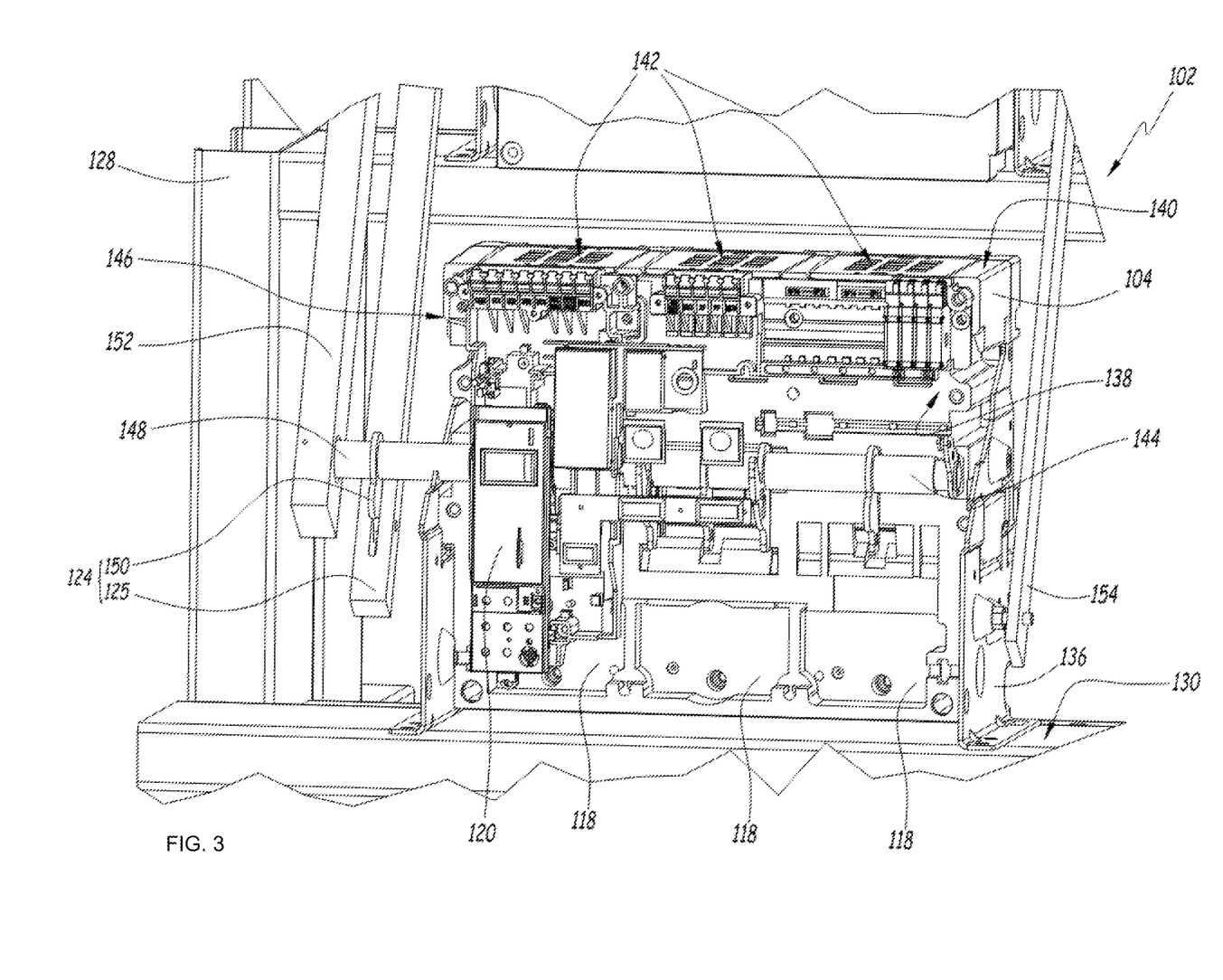
FIG. 3 is an enlarged view of the detail III in FIG. 2, some of the parts being hidden for ease of reading.
Figure 4:
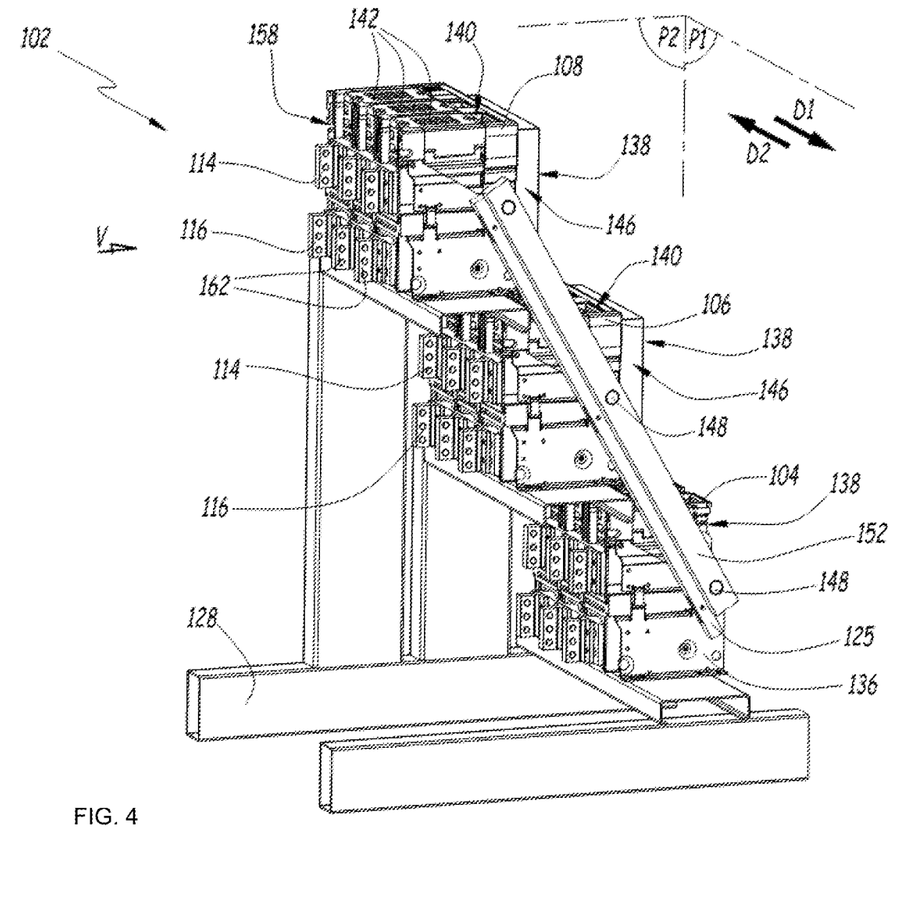
FIG. 4 is a perspective view of the protection system of FIG. 2, viewed along the arrow IV in FIG. 2, some of the parts being hidden for ease of reading.
Figure 5:
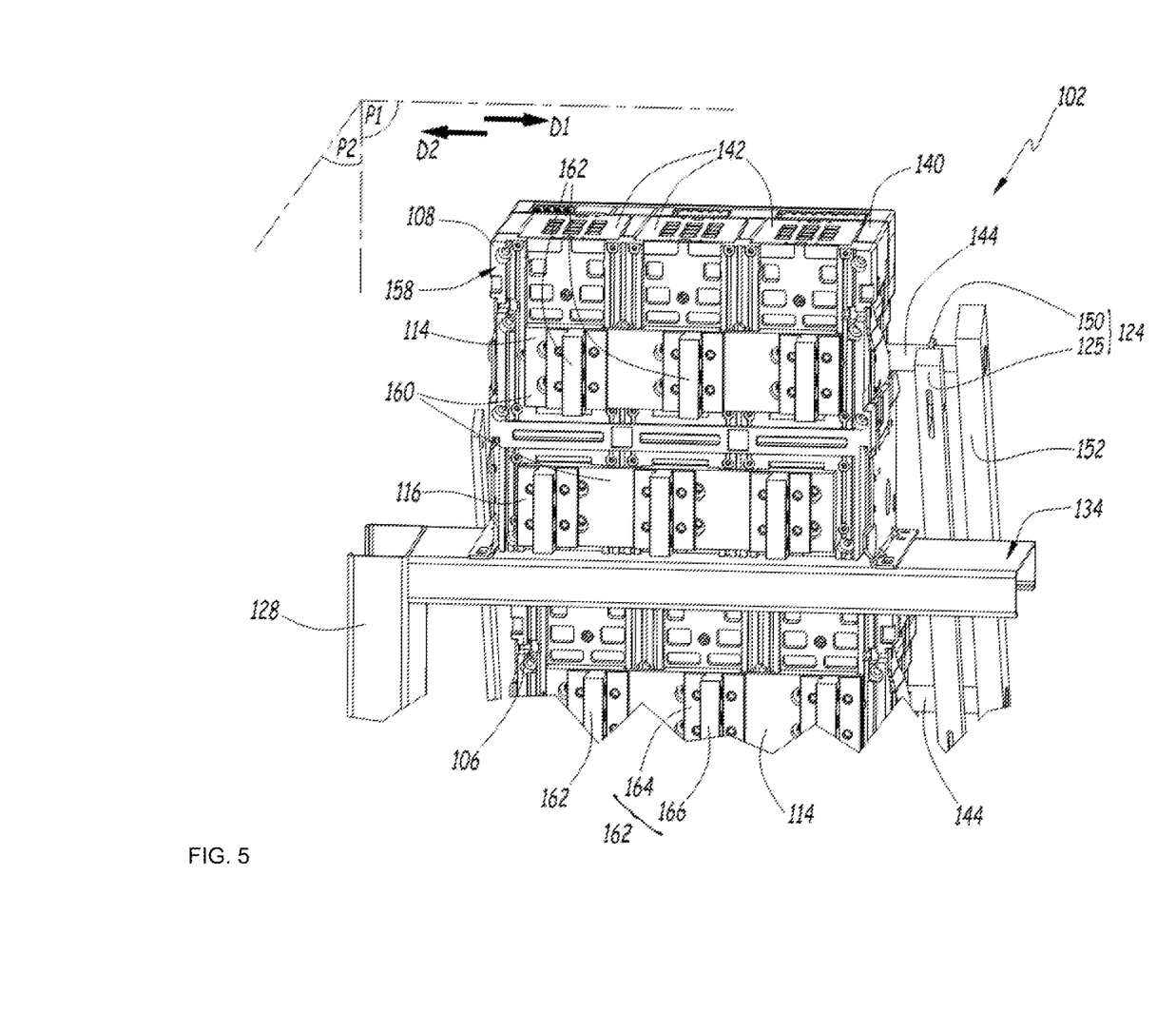
FIG. 5 is an enlarged view of the protection system of FIG. 2, viewed along the arrow V in FIG. 4.

In FIGS. 3 to 5, the frame 128 is partially shown for ease of reading. The frame 128 comprises three receiving spaces 130, 132 and 134 which are distinct from one another, and which are configured to accommodate a respective switching device 104, 106 and 108, the devices 104 to 108 thus being separated. Each of the receiving spaces 130 to 134 here includes a rectangle-shaped horizontal plate, the spaces 130 to 134 extending lengthwise parallel to one another.

The switching devices 104 to 108 are each attached to a respective receiving space 130 to 134 by means of flanges 136 and attachment members which are not shown.

Figure 2:
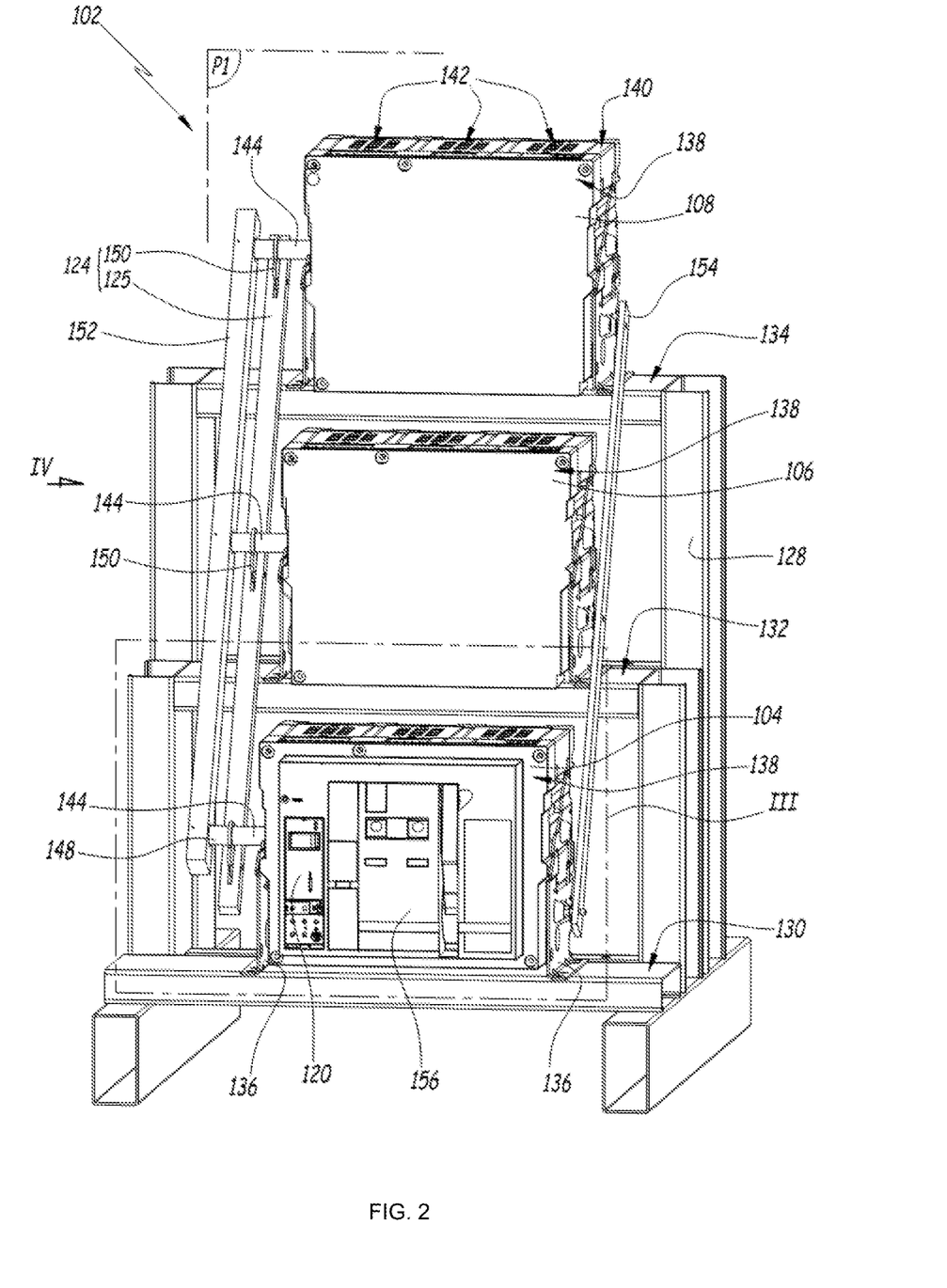
FIG. 2 is perspective view of a multipolar electrical protection system according to a second embodiment of the invention.

Each of the switching devices 104 to 108 is overall parallelepipedal in shape, with a front face 138. In the example illustrated, the front faces 138 are located in a vertical plane, are parallel to one another and are oriented in the same direction, in order to facilitate the use of the protection system 102. The front face 138 of the device 104 includes various control and/or monitoring members which are accessible to an operator in order to use the protection system 102.

For convenience, a transverse plane P1 of the protection system 2 is defined as being a plane parallel to the front faces 138 of the switching devices 104 to 108.

Additionally, a longitudinal plane P2 is defined as being a vertical plane orthogonal to the transverse plane P1.

The switching device 104 is shown enlarged in FIG. 3, a cover for the front face 138 being hidden for ease of reading. The switching device 104 includes a plurality of compartments 118 which correspond to the compartments 18 described above with reference to FIG. 1. In the example illustrated, the switching device 104 includes three compartments 118. Each compartment 118 comprises an extinguishing chamber, not shown, adjoining the separable contacts. Each extinguishing chamber opens onto an upper face 140 of the device 104 via a degassing opening 142 which serves to allow the breaking gases to escape from the extinguishing chambers.

The openings 142 are advantageously oriented upwards in order to facilitate the escape of the breaking gases. Advantageously, the switching devices 104 to 108 are spaced apart from one another in a direction orthogonal to the upper face 140 of each of the devices 104 to 108 so as to leave the degassing openings 142 of each of the switching devices 104 to 108 free and thus prevent a switching device 104 to 108 from being able to obstruct an opening 142 of another switching device 104 to 108. In the example illustrated, the switching devices 104 to 108 are spaced apart from one another in a horizontal direction.

Each switching device 104 to 106 comprises a control shaft 144, which is arranged transversely to the corresponding device 104 to 106 and which protrudes from a lateral face 146 of the devices 104 to 108 by an end 148 of the shaft 144. The end 148 is therefore located outside of the corresponding device 104 to 108. The separable contacts of one and the same switching device 104 to 108 are thus coupled to a common shaft 144 and are switched over together between the open and closed states under the action of the corresponding shaft 144.

More precisely, the shafts 144 are each in the shape of a cylinder centred on an axis, about which the shafts 144 are rotatably mobile with respect to the corresponding device 104 to 108, and the separable contacts of one of the switching devices 104 to 108 are moved between an open state and a closed state when the corresponding shaft 144 is rotated. When all of the separable contacts of one of the switching devices 104 to 108 are in the open/closed state, it is said by extension that the corresponding switching device 104 to 108 is also in the open/closed state.

The control shafts 144 of each device 104 to 108 are coupled to the mechanical connecting unit 124. The mechanical unit 124 comprises a control rod 125 which is connected to each of the control shafts 144 via levers 150. The connection between a shaft 144, a lever 150 and the rod 125 is more clearly visible in FIG. 3.

The lever 150 is secured, at a first end, to the shaft 144 in the vicinity of the end 148 of the shaft 144, while a second end of the lever 150, opposite the first end, is joined to the rod 125 in such a way as to pivot about an axis that is parallel to the axis of the corresponding shaft 144. The mechanical connecting unit 124 is therefore located outside of each of the devices 104 to 108.

The translational movements of the rod 125 are thus transformed into rotary movements of the shaft 144. Since the shafts 144 of all of the switching devices 104 to 108 are coupled by the mechanical unit 124, the rotary movements of one of the shafts 144 are copied by the other shafts 144 such that the separable contacts located within each of the devices 104 to 108 are moved together between the open or closed states. In other words, by virtue of the mechanical unit 124, the switchover of the switching devices 104 to 108 between the open and closed states is simultaneous.

Advantageously, the frame 128 and the mechanical unit 124 are made of a non-ferromagnetic, preferably metal material in order to avoid the generation of induction phenomena under the effect of the electric currents flowing through the protection system 2.

Preferably, a centring rod 152 and a guide 154 are provided in order to help the mechanical unit 124 to operate correctly, in particular to keep the shafts 144 parallel and the ends 148 aligned, in order to decrease friction within the mechanical unit 124 and to decrease the force required to rotate the shafts 144.

The centring rod 152 includes bores, in which bearings accommodating the ends 148 of the shafts 144 are housed. The shafts 144 are thus guided in rotation with respect to the rod 152 about their respective axis.

The guide 154 is connected to a flange 136 of each of the switching devices 104 to 108 on the side opposite the lateral face 146. It is understood that the control rod 125, the centring rod 152 and the guide 154 extend lengthwise in directions that are parallel to one another, the switching devices 104 to 108 thus being aligned in one and the same direction. More specifically, the shafts 144 of the devices 104 to 108 are parallel to one another, are coplanar, and the connections between the levers 150 and the corresponding shafts 144 are aligned.

One of the switching devices 104 to 108 further includes a tripping device.

In the example illustrated, the tripping device 120 is mounted on the switching device 104, which is the switching device located at the bottom of FIGS. 2 to 4. The tripping device 120 is preferably housed in a receiving housing provided for this purpose in the façade of one of the switching devices 104 to 108.

As a variant (not shown), the tripping device 120 is mounted on another of the switching devices 106 or 108, or even placed elsewhere such as on one of the switching devices 104 to 108.

In the example illustrated, the switching device 104 also comprises an actuator 156, shown in FIG. 2, the actuator 156 being driven by the tripping device 120.

The actuator 156 is designed to receive the trip order from the tripping device 120 and to actuate an energy accumulation mechanism, which is not shown, this mechanism pivoting the shaft 144 of the device 104 so as to switch over the separable contacts of the device 104.

The rotary motion of the shaft 144 of the device 104 is transmitted, via the mechanical unit 124, to the shafts 144 of the other switching devices 106 and 108, separating the separable contacts of the devices 106 and 108.

In other words, the switching devices 104 to 108 are controlled by one and the same common tripping device 120, which is here placed on or in the switching device 104.

The separable contacts of an extinguishing chamber are connected to an upstream connector 114 and to a downstream connector 116, which can be seen in FIGS. 4 and 5.

In the example illustrated, the connectors 114 and 116 are located on a rear face 158 of each of the devices 104 to 108, the rear face 158 being opposite the front face 138.

The upstream 114 and downstream 116 connectors each comprise a beam 160, of rectangular cross section, and connection pads 162 which may be attached to or integrated into said beam 160. In the example illustrated, two beams 160 are shown transversely on the rear face 158 of each of the devices 104 to 108, one above the other, the beams 160 being attached to the switching devices 104 to 108 by means of attachment members, such as screws.

Each connection pad 162 comprises a base 164, which is attached to a respective beam 160 by means of attachment members, and an attachment bar 166. The bar 166 here takes the form of an elongate block, arranged vertically lengthwise and protruding from the base 164. Each bar 166 includes through-bores which are designed to cooperate with other attachment members of an electrical installation, these attachment members not being shown.

Advantageously, the upstream 114 and downstream 116 connectors have the same structure, the upstream 114 and downstream 116 connectors being mounted in opposite directions on the rear face 158 of the switching devices 104 to 108.

For convenience, a direction D1 is defined as being a horizontal direction, located in the transverse plane P1 and oriented in the same direction as the lateral face 146, i.e. to the right of FIG. 5. Analogously, a direction D2 is defined as being a direction parallel to D1 and oriented in the opposite direction, i.e. to the left of FIG. 5.

Thus, in the example illustrated in FIG. 5, the connectors 114 are oriented in the direction D1 while the connectors 116 are oriented in the direction D2.

For example, the downstream connector 116 is upside down with respect to the upstream connector 114, such that the connection pads 162 of the upstream connector 114 are unaligned with respect to the connection pads 162 of the downstream connector 116.

In this way, the attachment bars 166 of the pads 162 do not hinder the circulation of the air flows at the rear of the device. This facilitates, by way of natural convection, the removal of the heat generated by the electric current flowing at the level of each pad 162.

Of course, a fan-forced convection system may be provided in order to assist in cooling the switching devices 104 to 108.

For example, the attachment bars 166 of one and the same device 104 to 108 are thus located in vertical planes parallel to the planes P2 which are distinct from one another.

Advantageously, each upstream 114 and downstream 116 connector of a device 104 to 108 comprises as many pads 162 as the corresponding device 104 to 108 comprises extinguishing chambers, each pad 162 being aligned with a respective extinguishing chamber along a plane parallel to the longitudinal plane P2.

In the example illustrated, each device 104 to 108 comprises three extinguishing chambers, while each of the connectors 114 and 116 comprises three connection pads 162, which are aligned with the three extinguishing chambers of the corresponding device 104 to 108.

Having pads 162 which are associated with each of the extinguishing chambers, these pads 162 being connected to one another by a beam 160, makes it possible to decrease the heating of the middle pad 162, i.e. that pad 162 which is located between the two other pads 162 of the same connector 114 or 116, which is thus decreased with respect to a situation in which the connection pads 162 were not connected to one another by a beam 160.

It is understood that, in the second embodiment of the protection system 102, the use of switching devices 104 to 108 which are distinct from one another but controlled by one and the same common tripping device 120 makes it possible to handle, in a relatively small volume, currents of high amperage by virtue of effective removal of heat and breaking gases.

Numerous aspects of the second embodiment may be implemented independently of the first embodiment. Likewise, the second embodiment may be implemented independently of the first embodiment.

In particular, the mechanical slaving of the switching devices to the tripping device may be implemented independently of the electronic slaving.

Additionally, the frame 128 may be used in the protection system 2 described above and is not exclusive to the second embodiment.

Furthermore, the connectors 114 and 116, both in terms of their structure and their arrangement, are not exclusive to the second embodiment and may be applied to the protection system 2 of the first embodiment.

In general, in the different embodiments described above, just one tripping device 20 or 120 is required to slave the switching devices 4 to 8 or 104 to 108. It is thus possible to manufacture protection systems 2 or 102 which exhibit higher switching performance while using switching devices comprising existing low-voltage circuit breaker components without having to design specific new components, which is economically and industrially advantageous.

The embodiments and the variants mentioned above may be combined with one another so as to create new embodiments of the invention.

The invention claimed is:

1. A multipolar electrical protection system including a plurality of devices for switching an electric current, each switching device having a plurality of compartments each comprising an extinguishing chamber and a pair of separable electrical contacts that are connected to upstream and downstream connection terminals, the separable electrical contacts being movable between open and closed positions under an action of a tripping device,
    wherein the switching devices are separate from one another,
    wherein the upstream terminals of each device are connected by a first connector in order to keep the upstream terminals at one and the same electrical potential,
    wherein the downstream terminals of each device are connected by a second connector in order to keep the downstream terminals at one and the same electrical potential, and
    wherein the switching devices are controlled by one and the same common tripping device which is configured to cause synchronized tripping of the switching devices.

2. The multipolar electrical protection system according to claim 1, wherein the first and second connectors of a switching device are located on a rear face of the device, are arranged transversely one above the other and each comprise connection pads, each associated/connected with one of the upstream or downstream terminals, each bar comprising as many connection pads as the switching device comprises extinguishing chambers.

3. The multipolar electrical protection system according to claim 2, wherein the first and second connectors of a switching device have the same structure and are oriented in two opposite transverse directions, the connection pads of the two connectors of one and the same device each being located in vertical planes that are distinct from one another.

4. The multipolar electrical protection system according to claim 1, wherein the switching devices include one and the same number of extinguishing chambers.

5. The multipolar electrical protection system according to claim 4, wherein each switching device comprises two, three or four extinguishing chambers.

6. The multipolar electrical protection system according to claim 1, wherein each extinguishing chamber of a switching device opens onto an upper face of the switching device via a respective degassing opening, and wherein the devices are spaced apart from one another in a direction orthogonal to the upper face so as to leave the degassing openings free of the other devices.

7. The multipolar electrical protection system according to claim 1, wherein each switching device includes a switchover mechanism for moving the separable contacts of said device, said switchover mechanisms being coupled to the tripping device.

8. The multipolar electrical protection system according to claim 7, wherein the tripping device forms part of an electronic control device distinct from the switching devices.

9. The multipolar electrical protection system according to claim 7, wherein the system includes accommodating bases, intended for attachment to an electrical installation, each base comprising electrical connections that are positioned so as to reversibly cooperate together with the connectors of a switching device.

10. The multipolar electrical protection system according to claim 1, wherein a first switching device includes an actuator and a switchover mechanism, the other switching devices being coupled to the first switching device by a mechanical unit that is arranged on the outside of the devices and connects these devices to one another.

11. The multipolar electrical protection system according to claim 10, wherein the switching device that includes the actuator also includes the tripping device which drives the actuator.

12. The multipolar electrical protection system according to claim 10, wherein each switching device includes a common control shaft to which the separable contacts are coupled, the shafts of each device being coupled to the mechanical unit.

13. The multipolar electrical protection system according to claim 10, wherein the system comprises a frame for the attachment of the switching devices, and wherein the frame and the mechanical unit are made of a non-ferromagnetic, preferably metal material.

* * * * *